US006018292A

United States Patent [19]

Penny, Jr.

[11] Patent Number: 6,018,292

[45] Date of Patent: Jan. 25, 2000

[54] EMERGENCY TRUNK RELEASE APPARATUS

[76] Inventor: Joseph W. Penny, Jr., 18083 Blanford, Cleveland, Ohio 44121

[21] Appl. No.: 09/342,881

[22] Filed: Jun. 29, 1999

[51] Int. Cl.[7] ...................... B60R 25/10

[52] U.S. Cl. ...................... 340/426; 340/542; 340/531; 340/532; 340/533; 340/425.5; 307/10.1; 307/10.2; 70/379 R; 70/92; 70/465

[58] Field of Search ...................... 340/426, 425.5, 340/542, 531, 532, 533; 307/10.1, 10.2; 70/379 R, 92, 465

[56] References Cited

U.S. PATENT DOCUMENTS

| | | | |
|---|---|---|---|
| 5,597,196 | 1/1997 | Gibbs | 296/98 |
| 5,729,191 | 3/1998 | Allen et al. | 340/426 |
| 5,736,793 | 4/1998 | Jahrsetz et al. | 307/10.1 |
| 5,808,375 | 9/1998 | Armbruster et al. | 307/10.2 |
| 5,859,479 | 1/1999 | David | 307/10.8 |

*Primary Examiner*—Jeffrey A. Hofsass
*Assistant Examiner*—Tai T. Nguyen

[57] ABSTRACT

A emergency trunk release apparatus of disclosed, comprised of comprising a lock bypass panel, located inside a trunk compartment. The lock bypass panel consists of an activation switch that is wired in parallel with a vehicle's electric trunk release such that its actuation will cause the trunk to open. The activation switch is a depression-type activation switch with an enlarged pad surface that allows it to be found easily in a dark trunk environment. The activation switch may be illuminated by any conventional means, so as to facilitate viewing in the darkness of the trunk. The present invention also includes a manual deactivation switch that takes the present invention temporarily out of service during times where cargo may accidentally activate the activation switch. It is envisioned that the present invention may be installed as a retrofit kit on existing automobiles or as original equipment on new vehicles.

15 Claims, 5 Drawing Sheets

EMERGENCY TRUNK RELEASE APPARATUS

RELATED APPLICATIONS AND DISCLOSURES

The present invention was first disclosed in the Disclosure Document no. 445877 filed on Sep. 17, 1998. There have been no previously filed, nor any co-pending applications, anywhere in the world.

BACKGROUND OF THE INVENTION

1. Field of the Invention

The present invention relates generally to trunk release means, and, more particularly, to an emergency trunk release apparatus.

2. Description of the Related Art

It is all too often that we learn of a tragedy involving death or serious injury that results from one being locked in the trunk of an automobile. Most often a result of children's playing, on a hot summer day, the trunk quickly becomes a furnace, reaching extreme temperatures that cause rapid dehydration and suffocation.

In other cases involving criminal activity such as car-jacking or kidnaping, one is forced into the trunk against his or her own will. Once again, suffocation or dehydration poses significant risks to life in this situation. Regardless of the manner in which one is trapped in a trunk, accidentally or by intent, the results are often deadly. Accordingly, there is a need for a means by which one can release an automobile trunk latch from the inside in a safe and effective manner.

In the related art, several devices are disclosed that describe an emergency trunk interior release latch. These include U.S. Pat. No. 5,445,326, issued in the name of Ferro et al., U.S. Pat. No. 4,155,233, issued in the name of Lira, U.S. Pat. No. 4,080,812, issued in the name of Knott and U.S. Pat. No. 3,992,909, issued in the name of McGhee.

U.S. Pat. No. 4,205,868, issued in the name of Kurth, discloses a safety lock for motor vehicle doors.

Several patents disclose a keyless entry system for automotive devices. These include U.S. Pat. No. 4,670,746, issued in the name of Taniguchi et al. and U.S. Pat. No. 4,205,325, issued in the name of Haygood et al.

U.S. Pat. No. 4,501,012, issued in the name of Kishi, et al. describes a speech recognition system for an automotive vehicle.

The problem with the devices cited in the prior art is that they are mechanical in design. This creates several problems, first, the person trapped in the trunk must be able to figure out how to use the mechanical escape latch, turnkey, etc. Second, the person may not be able to see the device in the trunk. Third, the person may not have the strength or manual dexterity to activate the device. Fourth, activation may be counterintuitive. Fifth, the device may protrude from the trunk front, thereby injuring the person trapped within.

Another problem with these devices is that they cannot be easily activated by a body part other than a person's hands. Thus, they are ineffective when a person is tied up and does not have full use of his or her hands.

Another problem with these devices is that they cannot be easily deactivated temporarily, at times when interior lock access is not wanted, such as when carrying cargo in the trunk.

A search of the prior art did not disclose any patents that anticipate directly many features of the instant invention.

Consequently, a need has been felt for providing an apparatus and method which overcomes the problems cited above.

SUMMARY OF THE INVENTION

It is therefore an object of the present invention to provide an improved emergency trunk release apparatus that facilitates quick and easy self-extrication of a person trapped in a trunk.

Briefly described according to one embodiment of the present invention, an emergency trunk release apparatus is disclosed, comprising a lock bypass panel, located inside a trunk compartment. The lock bypass panel consists of an electric activation switch that is wired in parallel with a vehicle's electric trunk release such that its actuation will cause the trunk to open.

For purposes of disclosure, the activation switch is a depression-type activation switch with an enlarged pad surface that allows it to be found easily in a dark trunk environment. The activation switch may be illuminated by any conventional means, such as a light bulb or long term luminescent material or coating so as to facilitate viewing of the lock bypass panel in the darkness of the trunk.

The present invention also includes a manual deactivation switch that takes the present invention temporarily out of service, via deactivation, during times where cargo may accidentally activate the activation switch. It is envisioned that the present invention may be installed as a retrofit kit on existing automobiles or as original equipment on new vehicles.

It is another object of the present invention to provide a device that can be easily found in a trunk.

It is another object of the present invention to provide a device that can be easily seen in a trunk.

It is another object of the present invention to provide a device that is easy to activate, and does not require significant manual dexterity or strength to activate.

It is another object of the present invention to provide device that can be activated without the use of hands, such as during a kidnaping, when a person is bound and tied.

It is another object of the present invention to provide device that can be easily activated by someone who does not have knowledge of its existence prior to entering the trunk.

It is another object of the present invention to provide a device that can be selectively deactivated, so that the trunk will not open when cargo is in the trunk.

It is another object of the present invention to provide a kit that can be quickly and easily installed in existing motor vehicles.

It is another object of the present invention to provide a device that can be used on all motor vehicles with electric trunk releases.

| DESCRIPTIVE KEY | |
|---|---|
| 10 | emergency trunk release apparatus |
| 20 | lock bypass panel |
| 30 | activation switch |
| 40 | electrical trunk release |
| 50 | trunk |
| 53 | door |
| 55 | exterior lock |
| 60 | motor vehicle |

-continued

| DESCRIPTIVE KEY | |
|---|---|
| 70 | pad |
| 80 | lighting means |
| 90 | attachment means |
| 100 | instructional indicia |
| 110 | deactivation switch |
| 120 | sliding switch |
| 130 | passenger compartment |
| 140 | battery |
| 150 | motor vehicle battery |
| 160 | alarm |
| 170 | body parts |
| 175 | electrical circuit |
| 180 | coil |
| 190 | electrical trunk lock |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 7.

1. Detailed Description of the Figures

Figure 1:
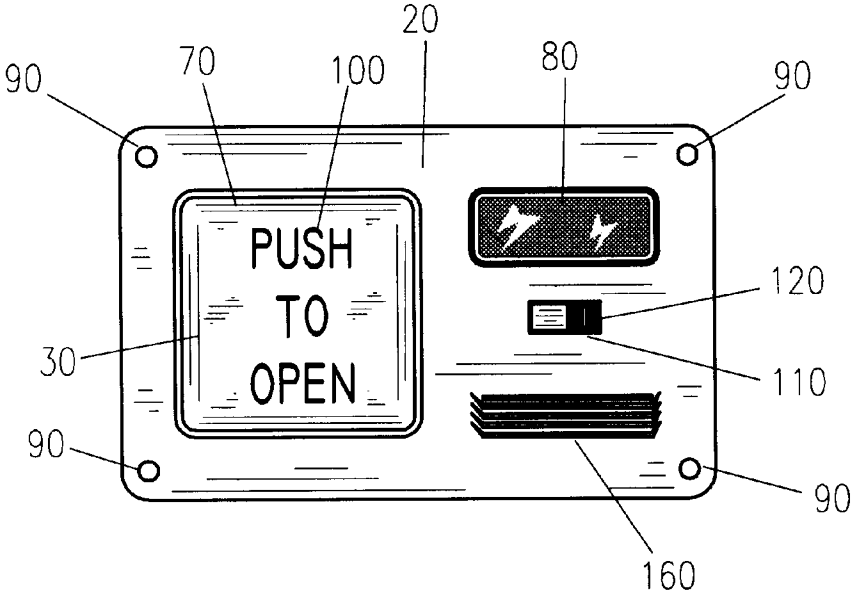
FIG. 1 is a perspective view of the lock bypass panel of the preferred embodiment of emergency trunk release apparatus 10.

Referring now to FIG. 1, an emergency trunk release apparatus 10 is shown, according to the present invention, comprises a lock bypass panel 20, of a generally rectangular, box like configuration, with an electric activation switch 30 that is wired in parallel with a motor vehicle's 60 (not shown in FIG. 1) electric trunk release 40 (not shown in FIG. 1) such that its actuation will cause the trunk 50 to open. The present invention is designed to work in conjunction with motor vehicles 60 (not shown in FIG. 1) having electrical trunk 50 opening systems (not shown in FIG. 1).

For purposes of disclosure, the activation switch 30 is a depression-type activation switch 30 with an enlarged pad 70 surface that allows it to be found easily in a dark trunk 50 environment. Thus, activation of the activation switch 30 is consistent with the pressing motion most people engage in when trapped in a confined space. This configuration also increases the chances of escape from the trunk 50 even when the person does not know the device is present before hand.

Figure 2:
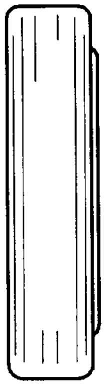
FIG. 2 is a top view thereof.
Figure 3:
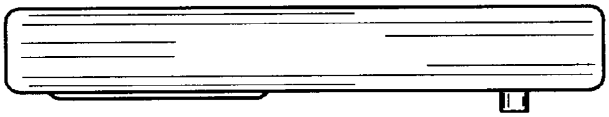
FIG. 3 is a right side view thereof.

FIGS. 2 and 3 show the generally, compact, rectangular configuration of the lock bypass panel 20.

Figure 4:
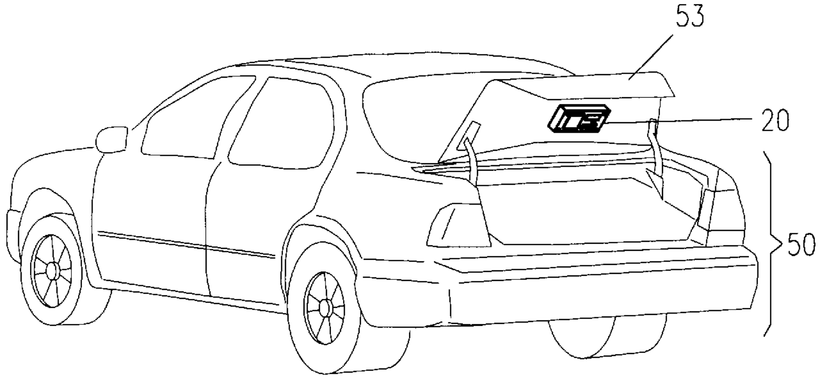
FIG. 4 is a perspective view of the present invention shown with an open motor vehicle trunk.
Figure 5:
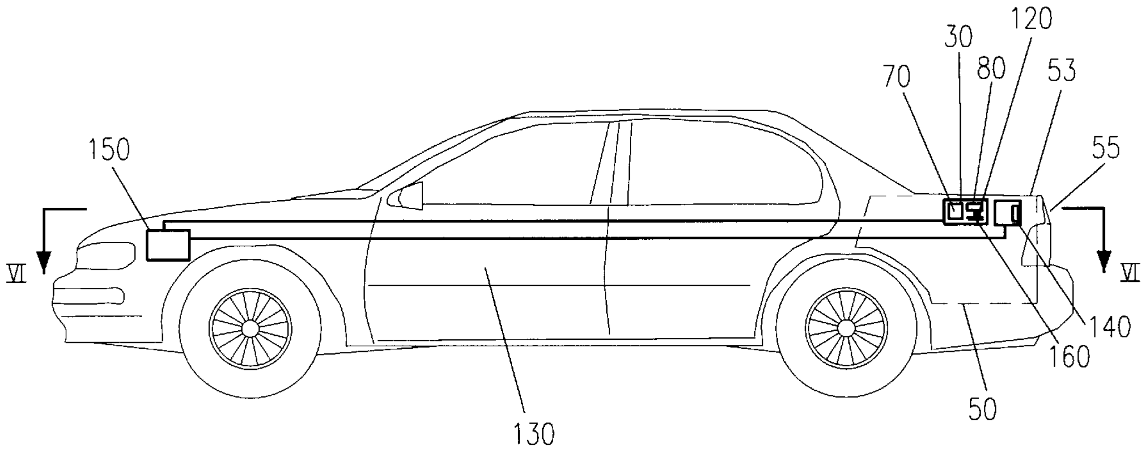
FIG. 5 is an electrical diagram of the present invention shown with a motor vehicle.

Referring now to FIGS. 4 & 5, mounted inside the trunk 50 compartment, in an easy to reach location, such as the interior of the trunk 50 door 53, near the exterior lock 55, the activation switch 30 provides a means by which one can release the latch from within, allowing them to escape in the event of accidental trapping or being placed therein against their will.

The lock bypass panel 20 is illuminated by any conventional lighting means 80, such as a light bulb or luminescent material or coating so as to facilitate viewing of the lock bypass panel 20 in the darkness of the trunk 50.

The lock bypass panel 20 is attached to the interior of the trunk 50 via attachment means 90.

It is envisioned that the activation switch 30, pad 70, deactivation switch 110, and alarm 160, or any combination thereof, may be remote from the lock bypass panel 20, but still located inside the trunk 50.

Instructional indicia 100 are present on the lock bypass panel 20, and are designed to instruct the person trapped in the trunk 50 how to activate the present invention. In the preferred embodiment, the words "push" or "push to release trunk" will assist unsuspecting people in escaping from the trunk 50.

The present invention also includes a manual deactivation switch 110 that takes the present invention temporarily out of service, via deactivation, during times where cargo may accidentally activate the activation switch 30. The manual deactivation switch 110 may be of any configuration that is not activated by being bumped. For purposes of disclosure, the manual deactivation switch 110 is depicted as a multi-position, sliding switch 120. It is envisioned that the manual deactivation switch 110 may be mechanical, electrical or other configurations.

Referring now to FIG. 5, the manual deactivation switch 110 may be located on the lock bypass panel 20, or in the trunk 50 separate from the lock bypass panel 20. For purposes of disclosure, the manual deactivation switch 110 is depicted as attached to the lock bypass panel 20.

It is envisioned that a battery 140, such as a rechargeable battery, is used as a backup electrical power source to the motor vehicle 60 battery 150. The battery 140 allows the present invention to operate even when the car's electrical system is not functioning. The battery 140 may be located in the lock bypass panel 20 or in the motor vehicle 60 separate from the lock bypass panel 20. For purposes of disclosure, the battery 140 is depicted as connected to the lock bypass panel 20.

It is also envisioned that an alarm 160 is electrically connected to the activation switch 30 such that activation of the activation switch 30 when the present invention is active activates the audible alarm 160. The alarm 160 may have an alarm deactivation switch.

Figure 6A:
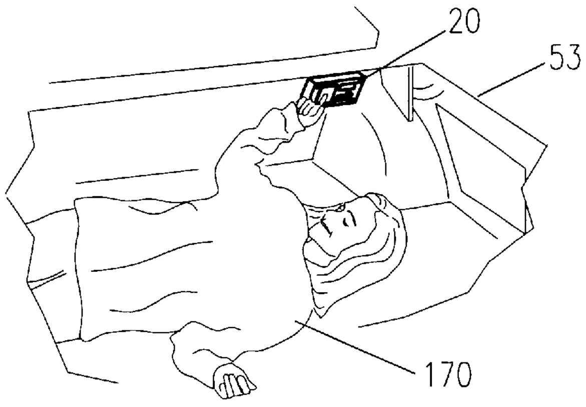
FIGS. 6*a*–6*c* are a series of cross sectional views, showing a person using the present invention to escape from a trunk, cut along line VI—VI of FIG. 5.
Figure 6B:
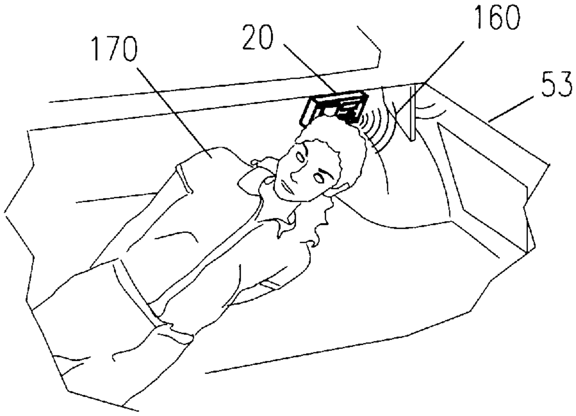
Figure 6C:
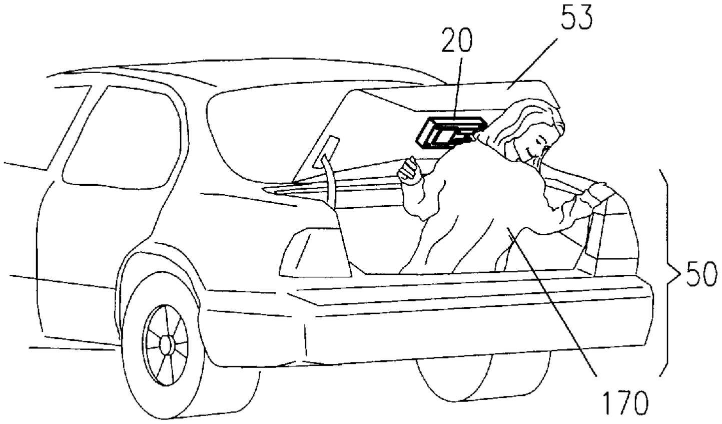

Referring now to FIGS. 6*a* through 6*c*, the pad 70 surface on the lock bypass panel 20 is of sufficiently large size so as to be capable of activation by a body part 170, such as a knee or elbow, thereby activating the electric trunk release 40 and opening the trunk 50 door 53. As such, the present invention can be activated during a kidnaping, when a person's hands and feet are tied together.

Figure 7:
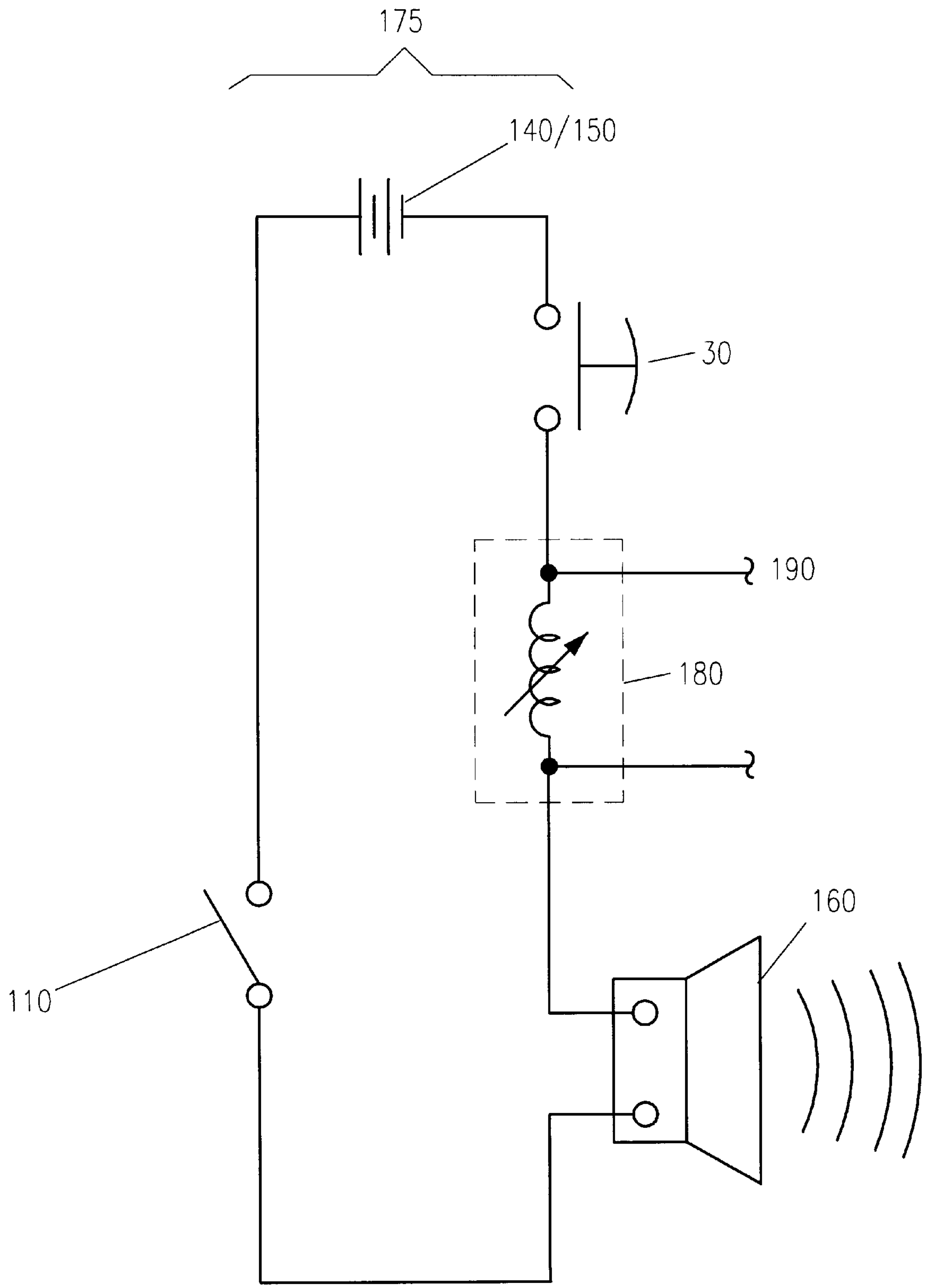
FIG. 7 is a schematic diagram of the present invention.

Referring now to FIG. 7, a schematic view of the electrical layout of the present invention in use with a motor vehicle 60 is depicted. The electrical activation switch 30 completes the electrical circuit 175 which includes the coil 180 on the electrical trunk lock 190, and alarm 160. The circuit 175 is powered by the motor vehicle battery 150 or the secondary battery 140. The manual deactivation switch 110 breaks the circuit 175, rendering the present invention inoperable.

It is envisioned that the present invention may be installed as a retrofit kit on existing motor vehicles 60 as original equipment on new motor vehicles 60. The kit would include the lock bypass panel 20, attachment means 90, and associated electrical wiring.

It is also envisioned that the present invention may be integrated into existing alarm systems and vehicle monitoring systems, such as Onstar or Rescue, as a monitored device.

Figure 8:
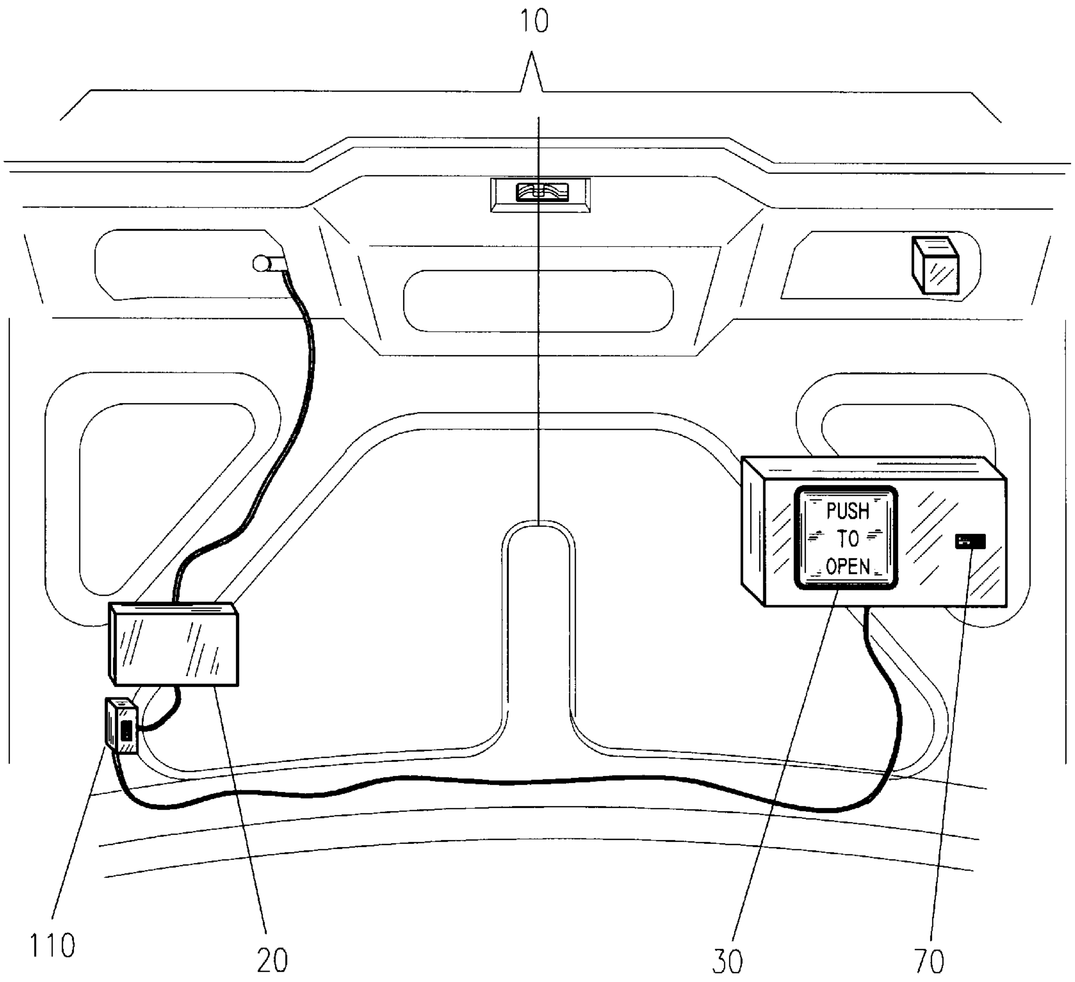
FIG. 8 is a perspective view of another embodiment of the present invention, showing the manual deactivation switch and activation switch and pad separate from the lock bypass panel.

Referring now to FIG. 8, another embodiment of the present invention is disclosed, showing the manual deactivation switch 110 and activation switch 30 and pad 70 separate from the lock bypass panel 20.

It is envisioned that other styles and configurations of the present invention can be easily incorporated into the teachings of the present invention, and only two particular configurations shall be shown and described for purposes of clarity and disclosure and not by way of limitation of scope.

2. Operation of the Preferred Embodiment

To use the present invention, the user presses against the pad 70 surface, thereby activating the activation switch 30, thereby activation the electric trunk lock 190 on the trunk 50. When cargo is being carried, the user deactivates the present invention by using the deactivation switch 110. The deactivation switch 110 is adjusted again to reactivate the present invention into an active mode.

The foregoing description is included to illustrate the operation of the preferred embodiment and is not meant to limit the scope of the invention. The scope of the invention is to be limited only by the following claims.

What is claimed is:

1. An emergency trunk release apparatus, said emergency trunk release apparatus comprising:

a lock bypass panel, of a generally rectangular, box like configuration, an activation switch, said activation switch being of a depression-type activation switch, wired in parallel with a vehicle's electric trunk release such that its actuation will cause the trunk to open;

a pad, said pad being generally flat, and used to activate said emergency trunk release apparatus;

lighting means, said lighting means used to illuminated said lock bypass panel;

attachment means, said attachment means designed to attach said lock bypass panel to the interior of a motor vehicle trunk;

a manual deactivation switch, said deactivation switch designed to place said emergency trunk release apparatus temporarily out of service;

an alarm, said alarm electrically connected to said activation switch such that activation of said activation switch when said emergency trunk release apparatus is active activates said audible alarm.

2. The emergency trunk release apparatus described in claim 1, wherein said manual deactivation switch is a multi-position, sliding switch.

3. The emergency trunk release apparatus described in claim 1, wherein said emergency trunk release apparatus further comprises a battery, said battery used as a backup electrical power source.

4. The emergency trunk release apparatus described in claim 1, wherein said emergency trunk release apparatus further comprises instructional indicia, said instructional indicia located on said lock bypass panel, and designed to instruct the person trapped in said trunk how to activate said emergency trunk release apparatus.

5. The emergency trunk release apparatus of claim 4, wherein said instructional indicia are located on said pad and consists of the words "push" or "push to release trunk."

6. The emergency trunk release apparatus described in claim 1, wherein said lock bypass panel is mounted inside said trunk compartment, in an easy to reach location by one in the trunk.

7. The emergency trunk release apparatus of claim 6, wherein said lock bypass panel is mounted on the interior of the trunk door, near the exterior door lock.

8. The emergency trunk release apparatus described in claim 1, wherein said pad surface on said lock bypass panel is of sufficiently large size so as to be capable of activation by an elbow, knee or any other body part.

9. The emergency trunk release apparatus described in claim 1, wherein said electrical activation switch completes the electrical circuit which includes the coil on the electrical trunk lock, and alarm; said circuit is powered by the motor vehicle's cars battery or a secondary battery; said manual deactivation switch breaks said circuit, rendering said emergency trunk release apparatus inoperable.

10. The emergency trunk release apparatus described in claim 1, wherein said emergency trunk release apparatus is installed as a retrofit kit on existing automobiles.

11. The emergency trunk release apparatus of claim 10, wherein said kit would include said lock bypass panel, with lighting means, pad and activation switch, deactivation switch and alarm, and associated electrical wiring.

12. The emergency trunk release apparatus described in claim 1, wherein said activation switch and pad are located on said lock bypass panel.

13. The emergency trunk release apparatus described in claim 1, wherein said activation switch and pad are remote from said lock bypass panel, but still located inside said trunk.

14. The emergency trunk release apparatus described in claim 1, wherein said deactivation switch is located on said lock bypass panel.

15. The emergency trunk release apparatus described in claim 1, wherein said deactivation switch is remote from said lock bypass panel.

* * * * *